(12) United States Patent
Dong et al.

(10) Patent No.: US 10,198,693 B2
(45) Date of Patent: Feb. 5, 2019

(54) METHOD OF EFFECTIVE DRIVING BEHAVIOR EXTRACTION USING DEEP LEARNING

(71) Applicant: International Business Machines Corporation, Armonk, NY (US)

(72) Inventors: Wei Shan Dong, Beijing (CN); Peng Gao, Beijing (CN); Jian Li, Beijing (CN); Chang Sheng Li, Beijing (CN); Wen Han Luo, Shenzhen (CN); Chun Yang Ma, Beijing (CN); Renjie Yao, Beijing (CN); Ting Yuan, Beijing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 15/332,407

(22) Filed: Oct. 24, 2016

(65) Prior Publication Data

US 2018/0113458 A1    Apr. 26, 2018

(51) Int. Cl.
*G06N 3/08*      (2006.01)
*B60W 40/08*    (2012.01)
(Continued)

(52) U.S. Cl.
CPC ............... *G06N 3/08* (2013.01); *B60W 40/08* (2013.01); *B60W 50/06* (2013.01); *G01S 19/42* (2013.01); *G01S 19/14* (2013.01); *G06N 3/0454* (2013.01)

(58) Field of Classification Search
None
See application file for complete search history.

(56) References Cited

U.S. PATENT DOCUMENTS 8,554,468 B1    10/2013  Bullock
8,738,523 B1 *   5/2014  Sanchez ................. G06Q 40/00
                                                            705/39

(Continued)

OTHER PUBLICATIONS

AbuAli et al., "Driver Behavior Modeling: Developments and Future Directions", International Journal of Vehicular Technology, vol. 2016. Hindawi Publishing Corporation. (Year: 2016).*

(Continued)

*Primary Examiner* — Mussa A Shaawat
*Assistant Examiner* — Abdhesh K Jha
(74) *Attorney, Agent, or Firm* — Scully, Scott, Murphy & Presser, P.C.; Vazken Alexanian (57) ABSTRACT

Systems and methods for obtaining vehicle operational data and driving context data from one or more monitoring systems, including converting the obtained vehicle operational data and driving context data into sequential vehicle operational feature data and sequential driving context feature data, calibrating the sequential vehicle operational feature data and the sequential driving context feature data temporally to form calibrated sequential vehicle operational feature data and calibrated sequential driving context feature data, constructing a sequence table of temporal sample points based on the calibrated sequential vehicle operational feature data and the calibrated sequential driving context feature data, feeding the sequence table into a deep neural network model for applying network learning to form a trained deep neural network model, extracting driving behavior features from the trained deep neural network model and analyzing the extracted driving behavior features to determine driving behavior characteristics of the driver.

17 Claims, 9 Drawing Sheets

(51) Int. Cl.
*B60W 50/06* (2006.01)
*G01S 19/42* (2010.01)
*G01S 19/14* (2010.01)
*G06N 3/04* (2006.01)

(56) References Cited

U.S. PATENT DOCUMENTS

| | | | |
|---|---|---|---|
| 9,053,591 B2 | 6/2015 | Phelan et al. | |
| 9,081,650 B1 | 7/2015 | Brinkmann et al. | |
| 9,315,195 B2 | 4/2016 | Armitage et al. | |
| 9,870,649 B1* | 1/2018 | Fields | G08G 1/096791 |
| 2013/0135092 A1* | 5/2013 | Wu | B60K 28/066 340/439 |
| 2014/0322676 A1* | 10/2014 | Raman | G09B 19/167 434/65 |
| 2015/0213555 A1* | 7/2015 | Barfield, Jr. | G06Q 40/08 705/4 |
| 2016/0282124 A1* | 9/2016 | Chowdhury | G07C 5/0816 |
| 2017/0032672 A1* | 2/2017 | Bijlani | B60Q 9/00 |
| 2017/0154225 A1* | 6/2017 | Stein | B60W 30/16 |
| 2017/0297586 A1* | 10/2017 | Li | G05D 1/0088 |
| 2018/0074497 A1* | 3/2018 | Tsuji | G06K 9/00288 |

OTHER PUBLICATIONS

Ferreira J, Ju'nior, Carvalho E, Ferreira BV, de Souza C, Suhara Y, Pentland A, et al. (2017)Driver behavior profiling: An investigation with different smartphone sensors and machine. (Year: 2016).*

Li Z. et al., "Unsupervised Detection of Driver's Behavior Patterns", Australasian Transport Research Forum (ATRF), 37th (10 pages) (2015).

Mell P., et al., "The NIST Definition of Cloud Computing", NIST Special Publication 800-145, National Institute of Standards and Technology, U.S. Department of Commerce, pp. 1-7 (Sep. 2011).

* cited by examiner

METHOD OF EFFECTIVE DRIVING BEHAVIOR EXTRACTION USING DEEP LEARNING

FIELD

The present application relates generally to computers, and computer applications, and more particularly to computer-implemented methods to extract driving behavior using deep learning.

BACKGROUND

The determination of who is driving a car and how they drive is useful for analysis and recordation for later use. Typically to determine who is driving a specific car and their individual driving style requires self identification and/or self tracking with an additional device added to the vehicle.

Typical models used to determine driving behaviors consists of human detailed and specific features from raw data, with a heavy reliance on human domain knowledge and experience. This reliance on human domain knowledge and experience is not always reliable and typically not always complete.

BRIEF SUMMARY

One embodiment of a computer implemented method for obtaining vehicle operational data and driving context data from one or more monitoring systems, converting the obtained vehicle operational data and driving context data into sequential vehicle operational feature data and sequential driving context feature data, calibrating the sequential vehicle operational feature data and the sequential driving context feature data temporally to form calibrated sequential vehicle operational feature data and calibrated sequential driving context feature data, constructing a sequence table of temporal sample points based on the calibrated sequential vehicle operational feature data and the calibrated sequential driving context feature data, feeding the sequence table into a deep neural network model for applying network learning to form a trained deep neural network model, extracting driving behavior features from the trained deep neural network model and analyzing the extracted driving behavior features to determine driving behavior characteristics of the driver.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The disclosure is directed to a computer system and a computer-implemented method to extract human vehicle driving behavior using deep learning. Although the term vehicle is used throughout this application, the term vehicle is meant to include any vehicle or automobile that is capable of transporting a driver, including aircraft, trains and marine vehicles. Among other uses for this method are the identification of who is or was driving a vehicle, determining how many drivers share the same vehicle and modeling the driving style signatures of drivers of a vehicle.

Figure 1:
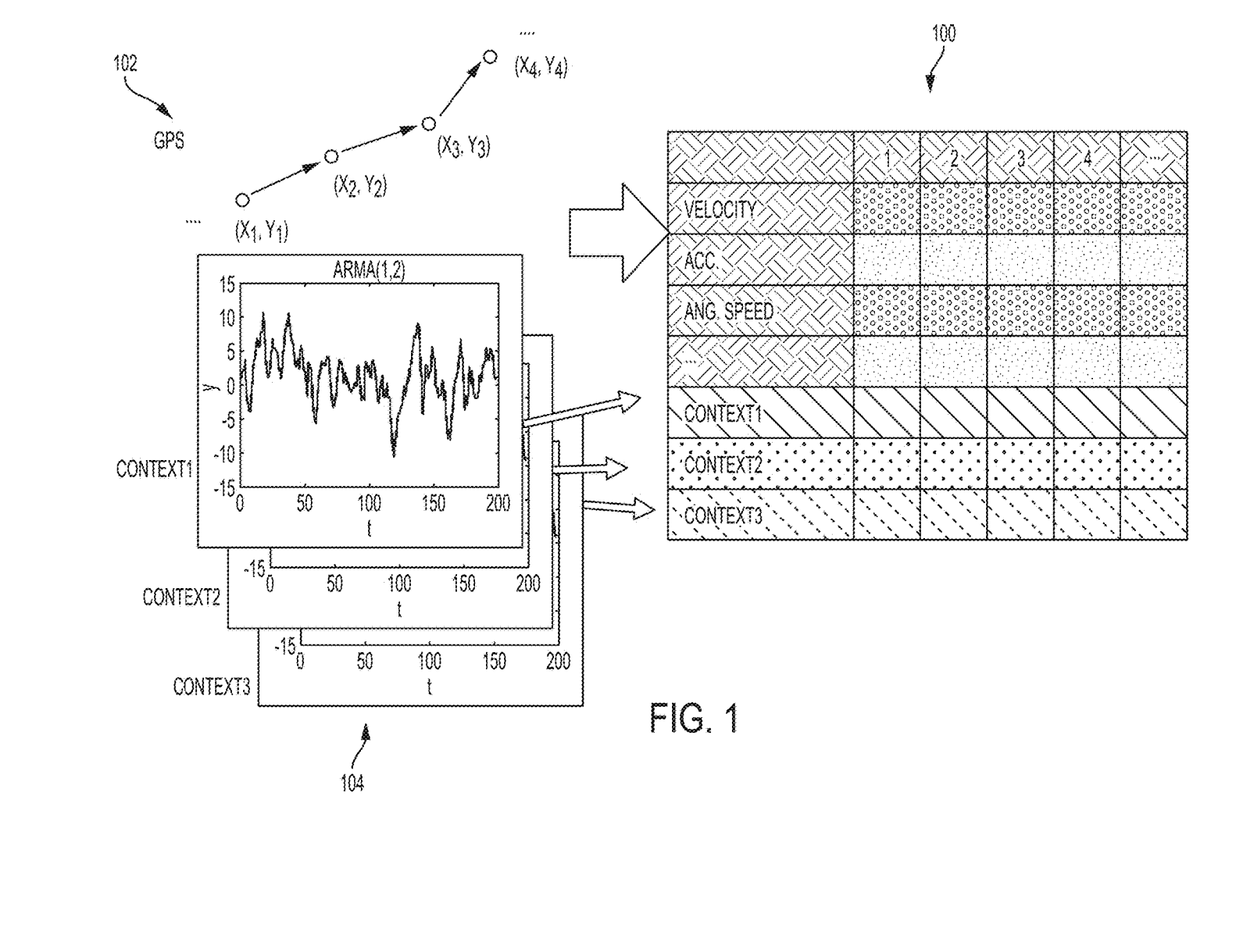
FIG. 1 is an illustration of the formation of a sequence table, in accordance with an embodiment of the present invention.

FIG. 1 depicts an overview of the beginning steps of a method for extracting driving behavior and forming a sequence table 100. The sequence table 100 is formed from initial inputs of vehicle operational data 102 and driving context data 104, which is first sequenced and then calibrated as discussed below.

Figure 4:
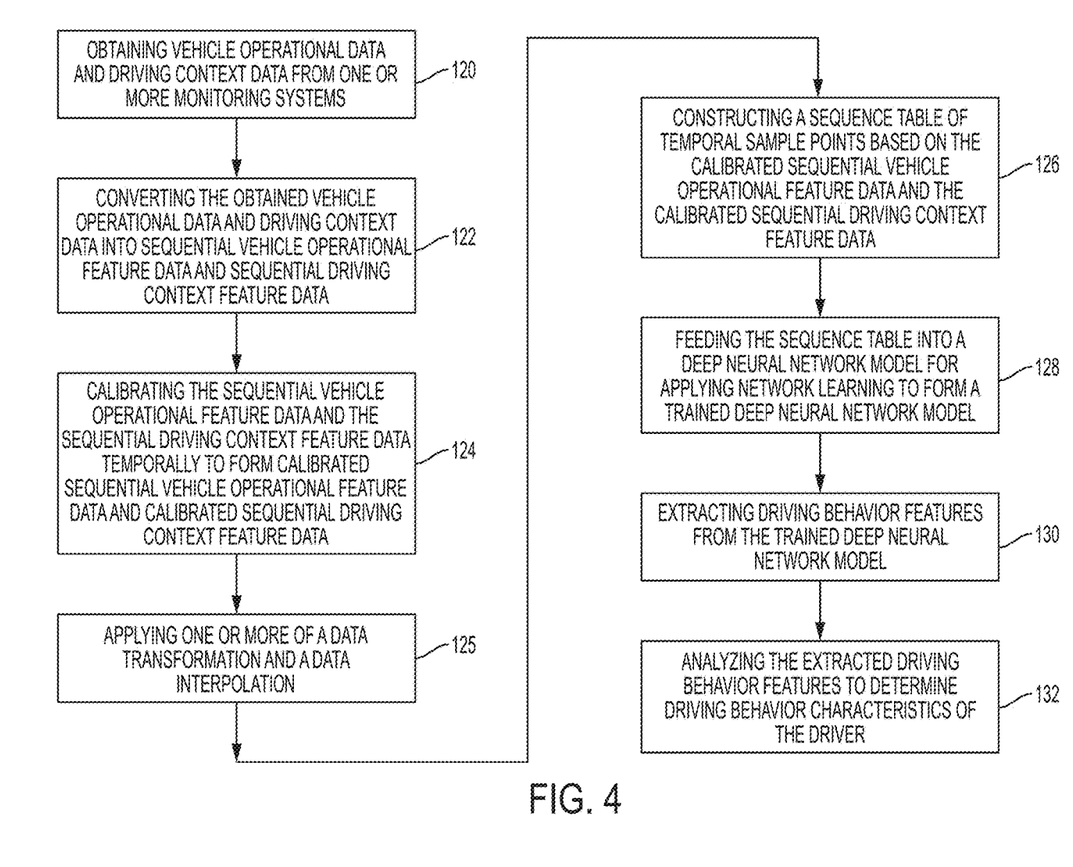
FIG. 4 is a flowchart including several steps of the disclosed method, in accordance with an embodiment of the present invention.

Both vehicle operational data 102 and driving context data 104 can be gathered from one or more monitoring systems outside of the vehicle, for example a UPS monitoring system and interne of things (IoT) sensors and/or inside the vehicle, for example on-board diagnostic (OBD) monitors in step 120 of FIG. 4.

In one embodiment vehicle operational data 102 includes GPS vehicle location data at various time points. Although only x and y location data are shown as part of vehicle operational data 102, elevation or "z" data can also be included. From this GPS vehicle location data at various time points, the sequence table 100 can be populated with data regarding, instantaneous speed of the vehicle, velocity of the vehicle, acceleration of the vehicle, angular speed of the vehicle and also a difference of each of these data points from a normal or average in, instantaneous speed of the vehicle, velocity of the vehicle, acceleration of the vehicle, angular speed of the vehicle. This average or normal value for each data point can be a predetermined value or a calculated value assigned to each individual driver based on historical data.

In one embodiment driving context data 104 is obtained from a plurality of OBD monitors and IoT monitors at various time points and is selected from the group consisting of weather condition data ("Context 1" of FIG. 1), driving route attribute data ("Context 2" of FIG. 1) and passenger information data ("Context 3" of FIG. 1).

The weather condition data can be selected from one or more of vehicle outside and/or inside temperatures, wind speeds, vehicle outside and/or inside humidity, vehicle outside oxygen levels and vehicle outside air particulate levels.

The driving route attribute data can be selected from one or more of travelled road shape data, road attribute data (such as type of road, road material, grade of road, amount and severity of holes or bumps in the road), traffic volume data and traffic light data.

The passenger information data can be selected from one or more of vehicle weight, vehicle engine status, vehicle fuel status, vehicle steering and passenger data (such as number of passengers, relationship of passenger to driver and location of passenger in the vehicle).

During gathering of vehicle operational data 102 and driving context data 104, or after all vehicle operational data 102 and driving context data 104 are gathered, the data at various time points are converted to sequential vehicle operational data and sequential driving context data in step 122 of FIG. 4. These sequential vehicle operational data and sequential driving context data are sequenced in a time order at predetermined time intervals.

These sequential vehicle operational data and sequential (hiving context data are then calibrated with each other temporally to form calibrated sequential vehicle operational feature data and calibrated sequential driving context feature data in step 124 of FIG. 4.

The calibrated sequential vehicle operational feature data and calibrated sequential driving context feature data include various values at one time and are arranged in one column of sequence table 100. For example, in column 1, at time 1 (e.g. 2:00:00 PM) calibrated sequential vehicle operational data and calibrated sequential driving context data for time 1 are placed. To construct the feature sequence table 100, in step 126 of FIG. 4, the placement in subsequent columns can continue until all sequential vehicle operational data and sequential driving context data are used, or until a predetermined limit of sequential vehicle operational data and sequential driving context data is reached.

If data are missing for one of the rows for a specific time, in either the calibrated sequential vehicle operational feature data or the calibrated sequential driving context feature data, the method can optionally proceed first to step 125 of FIG. 4 where the missing data can be interpolated by any suitable data handling process and/or determined by undergoing any suitable data transformation. Then the method proceeds to step 126 discussed above.

After construction of the sequence table 100, the sequence table 100 can be fed into a deep neural network (DNN) model in step 128 of FIG. 4. DNN models are neural networks having multiple hidden layers. With a DNN, each hidden layer determines a non-linear transformation of a previous layer. The training of DNNs may be considered a non-convex problem. That is, illustrated as a graph, a non-convex function (e.g., the loss of the neural network, treated as a function of its weights) can have many local minima.

Figure 5:
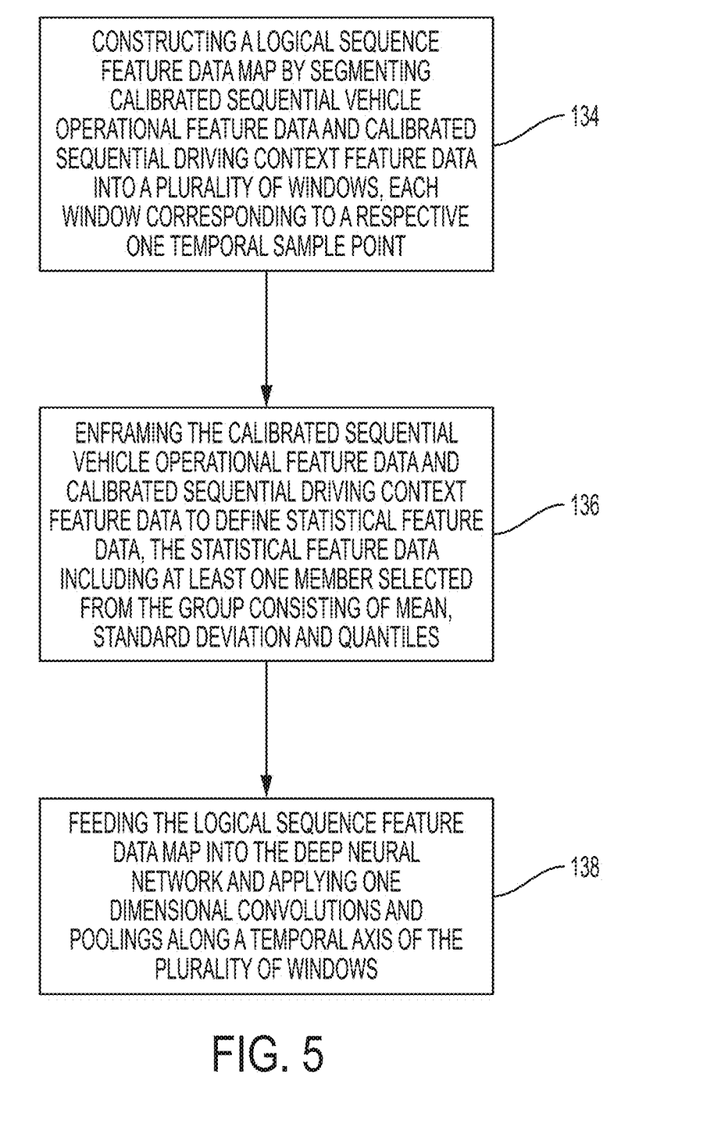
FIG. 5 is a flowchart including several optional steps of the disclosed method, in accordance with an embodiment of the present invention.

To feed the sequence table 100 into the DNN model the sequence table 100 can include first forming a logical sequence feature data map in step 134 of FIG. 5. The logical sequence feature data map is formed by segmenting the calibrated sequential vehicle operational feature data and calibrated sequential driving context feature data into a plurality of windows 106 in FIG. 2. By segmenting the calibrated sequential vehicle operational feature data and calibrated sequential driving context feature data into a plurality of windows 106, each window 106 corresponds to a respective one temporal sample point-so that each window 106 is calibrated to one temporal sample point. The respective one temporal sample point is shown as a single column. in the sequence table 100 of FIG. 1. Therefore, the plurality of windows 106 can equal the number of columns in the sequence table 100. Also, each of these windows 106 can correspond to one sample for training the DNN model upon being fed into the DNN model.

Then, an optional next step is enframing the data of the window feature maps 106 (which is the calibrated sequential vehicle operational feature data and the calibrated sequential driving context feature data) to form statistical feature data 108 in step 136 of FIG. 5. The statistical feature data 108 can include at least one element selected from the group consisting of a mean, a standard deviation and quantiles of the data in window feature maps 106. This enframing can also be used to remove noise present in the data of window feature maps 106.

Figure 2:
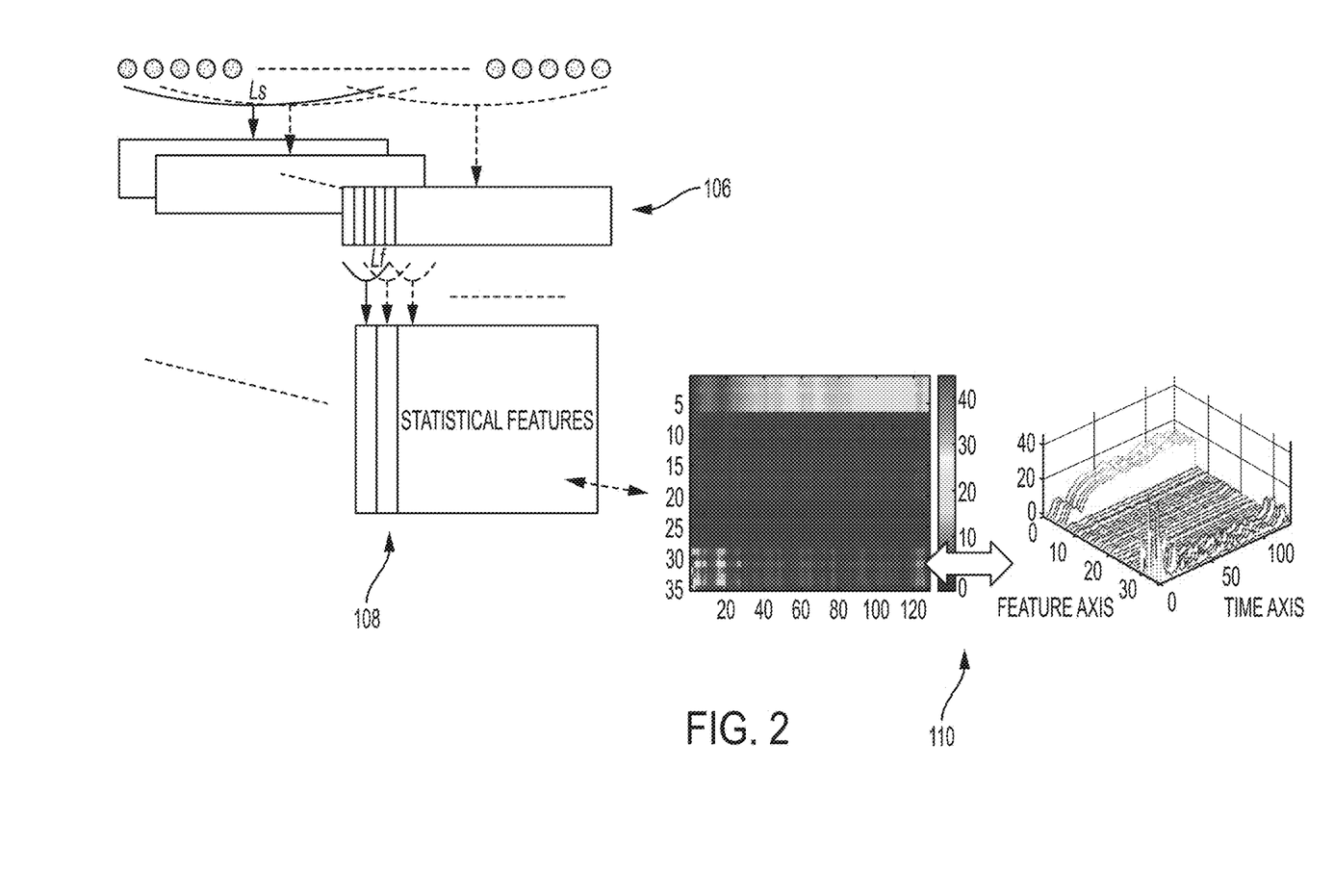
FIG. 2 is an illustration of the formation of a logical sequence feature data map, in accordance with an embodiment of the present invention.

The statistical feature data 108 can be combined and formed into a data map 110 by performing any suitable data transformation. Data map 110 can be illustrated in two dimensions (left hand figure) or in three dimensions (right hand figure) and spans a length of time over which data has been gathered in sequence table 100.

The statistical feature data 108 can also be fed into a DNN model with each of the windows of statistical feature data 108 acting as a feature map at each of their specified times. The statistical feature data 108 is fed into the DNN model by either proceeding directly from step 134 to step 138 of FIG. 5, or from step 134, through step 136 to step 138 of FIG. 5. For example the first window of statistical feature data 112 at time t is first fed, with a second window of statistical feature data 114 at time t+1 fed second, with this continuing until all or a portion of all of the statistical feature data 108 is fed into the DNN model, which can be a convolutional neural net (CNN) or a recurrent neural network (RNN).

Figure 3:
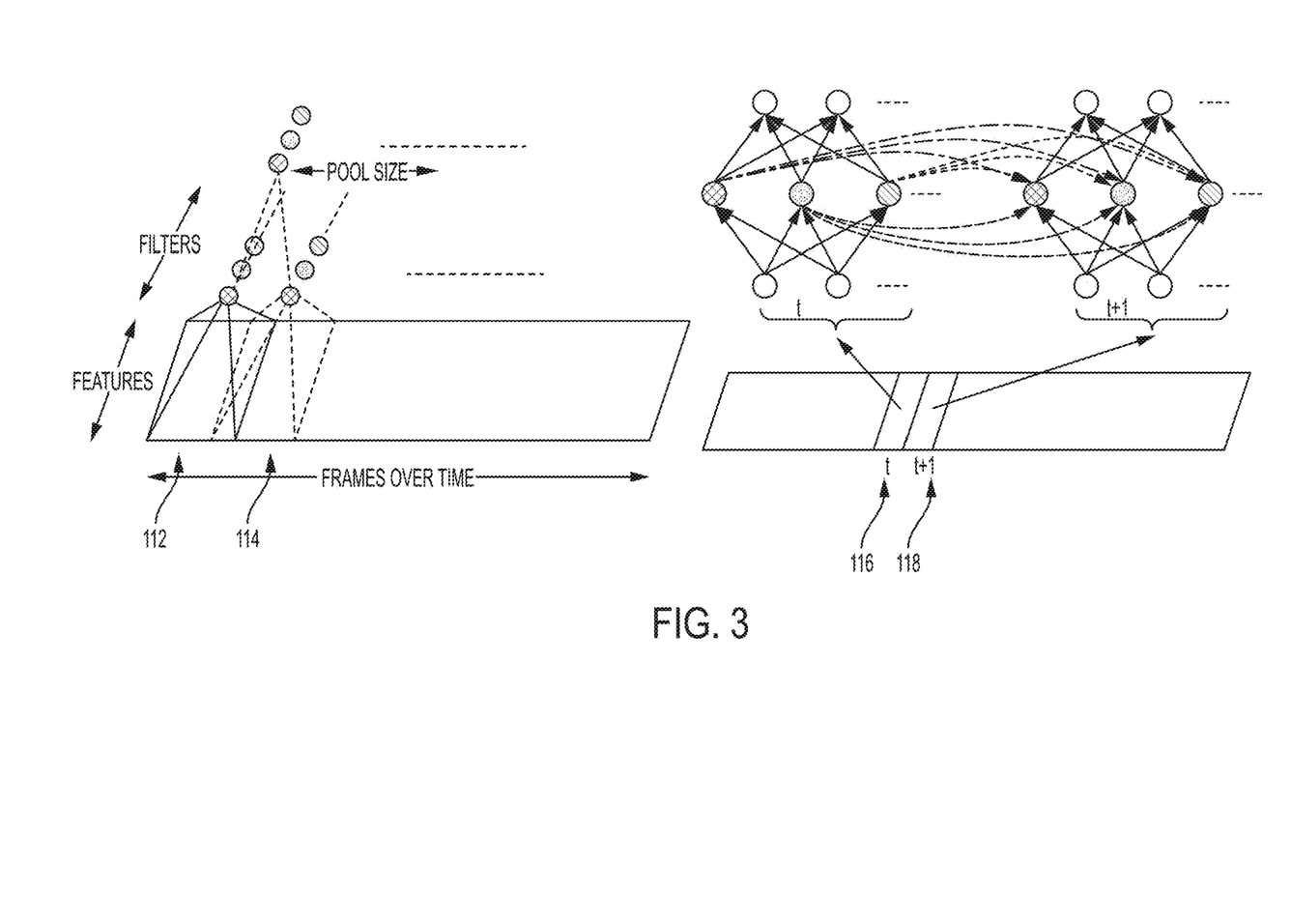
FIG. 3 is an illustration of one dimensional convolutions and poolings along a temporal axis, in accordance with an embodiment of the present invention.

The DNN model applies one dimensional convolutions and poolings along a temporal. axis, from data at time t 116, to data at time t+1 118, etc. of the statistical feature data 108, as shown in FIG. 3. The convolutions and poolings are only along the time dimension (typically horizontal) axis and not along a feature axis (typically vertical). As more data is entered into the DNN model and as the convolutions and poolings continue, the DNN model is further trained into a trained DNN model.

The trained DNN model can be used to extract driving behavior features, in step 130 of FIG. 4, upon an optional removal of a created classification layer. These extracted driving behavior features can then be analyzed, in step 132 of FIG. 4 to determine driving behavior characteristics of a driver, in real-time or in the future, such as average acceleration values, average speed values, etc.

Figure 6:
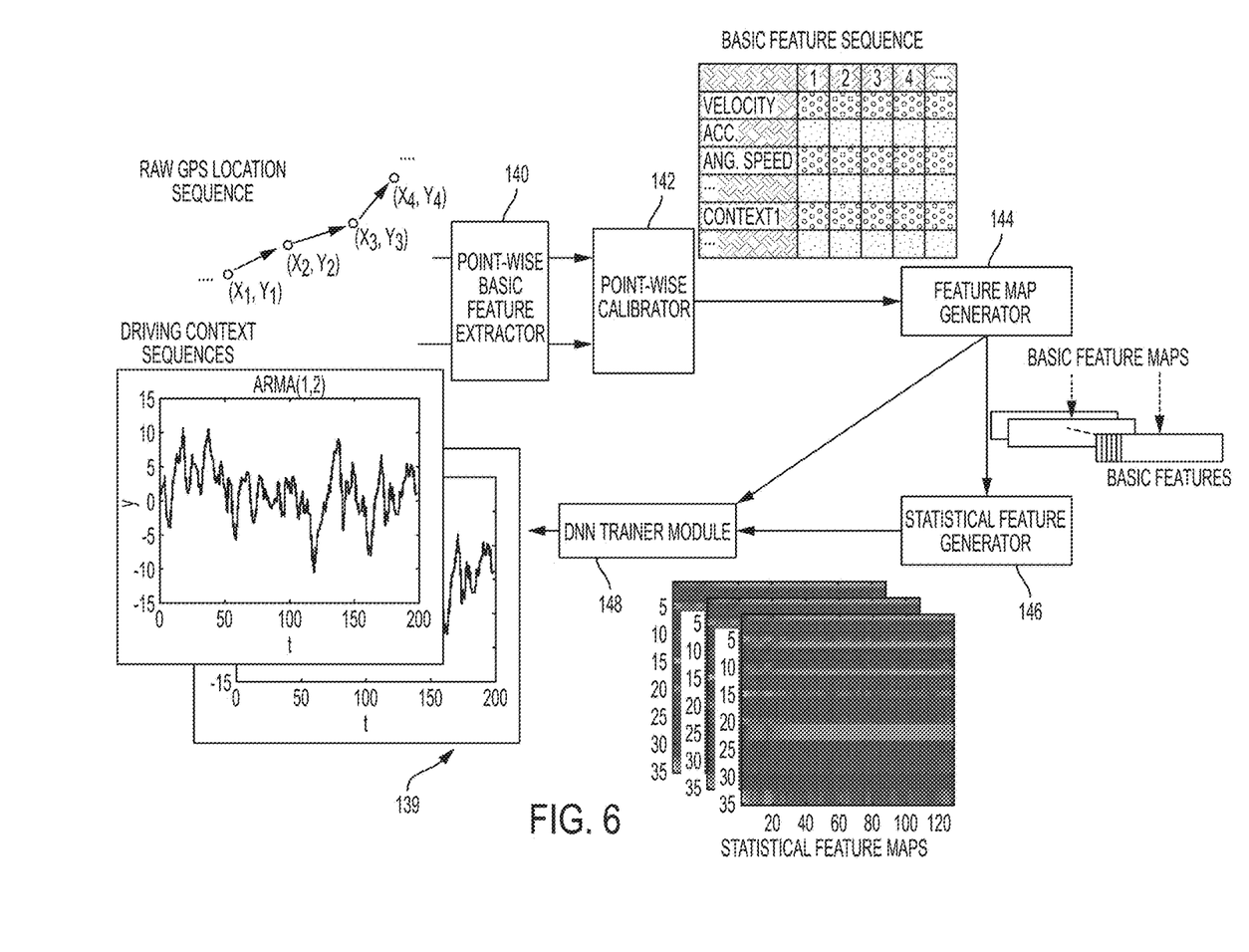
FIG. 6 illustrates a system configured to determine driving behavior characteristics, in accordance with an embodiment of the present invention.

The above described methods can also be performed in a suitable system 139, such as that shown in FIG. 6. Each of the numbered portions of the system 139 can represent one or more hardware processors.

The point-wise basic feature extractor 140 is configured to obtain input of vehicle operational data (102 of FIG. 1) and driving context data (104 of FIG. 1). The point-wise basic feature extractor 140 is configured to then convert the obtained vehicle operational data and driving context data into sequential vehicle operational feature data and sequential driving context feature data and transmit that data to the point-wise calibrator 142.

The point-wise calibrator 142 is configured to calibrate the sequential vehicle operational feature data and the sequential driving context feature data temporally to form calibrated sequential vehicle operational feature data and calibrated sequential driving context feature data, and transmit that data to the feature map generator 144.

The feature map generator 144 is configured to construct a sequence table of temporal sample points based on the calibrated sequential vehicle operational feature data and the calibrated sequential driving context feature data and feed that sequence table into statistical feature generator 146 or DNN trainer module 148 directly.

Statistical feature generator 146 is configured to enframe the calibrated sequential vehicle operational feature data and calibrated sequential driving context feature data to define statistical feature data, the statistical feature data including at least one member selected from the group consisting of mean, standard deviation and quantiles, and output such data to the DNN trainer module 148.

DNN trainer module 148 is configured to receive data from feature map generator 144 directly or from statistical feature generator 146 and to train the DNN model with the received data. Once suitably trained the DNN trainer module 148 can extract driving behavior features from the trained DNN model and analyze the extracted driving behavior features to determine driving behavior characteristics of the driver.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 7:
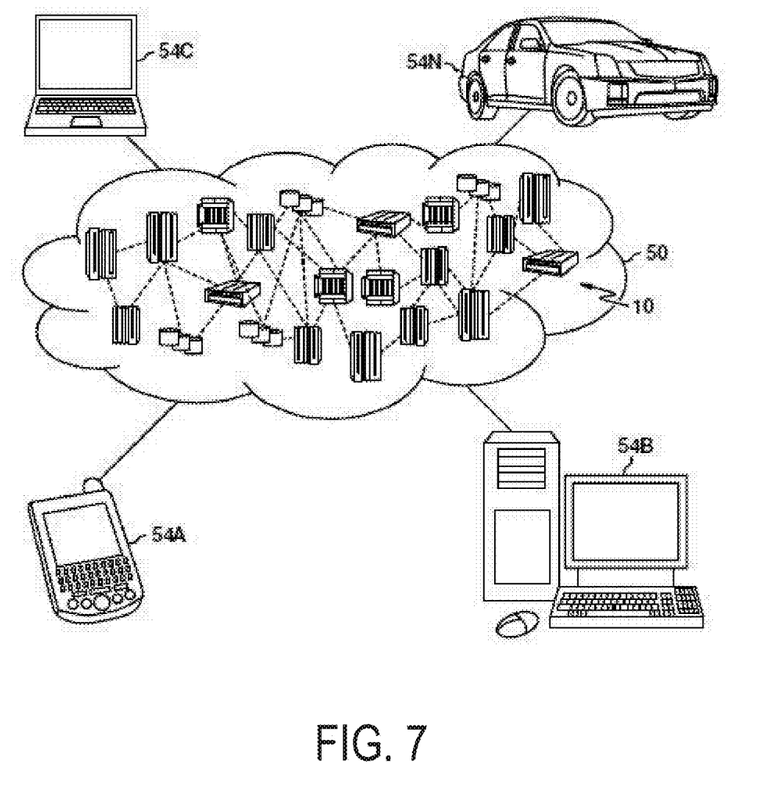
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
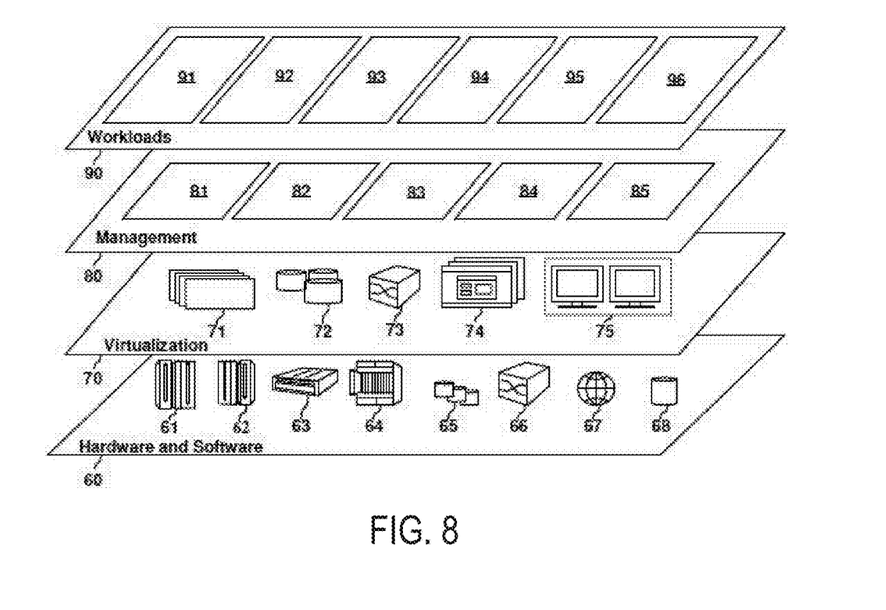
FIG. 8 depicts abstraction model layers according to an embodiment of the present invention.

Referring now to FIG. 8, an exemplary set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining driving behavior characteristics of a driver of a vehicle 96.

Figure 9:
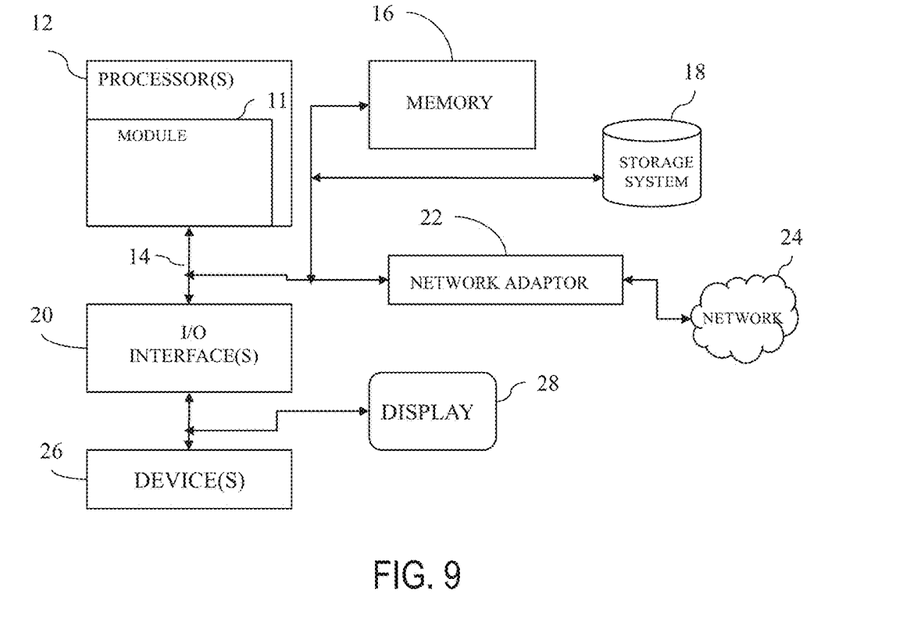
FIG. 9 illustrates a schematic of an example computer or processing system according to an embodiment of the present disclosure.

FIG. 9 illustrates a schematic of an example computer or processing system that may implement the method for determining driving behavior characteristics of a driver of a vehicle in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 11 that performs the methods described herein. The module 11 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (110) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are riot limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Srnalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed dements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for determining driving behavior characteristics of a driver of a vehicle comprising:
    obtaining vehicle operational data and driving context data from one or more monitoring systems over a plurality of temporal data points;
    converting the obtained vehicle operational data and driving context data into sequential vehicle operational feature data and sequential driving context feature data;
    associating the sequential vehicle operational feature data to the sequential driving context feature data of corresponding temporal data points of the plurality of temporal data points to form calibrated sequential vehicle operational feature data and calibrated sequential driving context feature data;
    constructing a sequence table of a sequence of the plurality of temporal data points based on the calibrated sequential vehicle operational feature data and the calibrated sequential driving context feature data associated with each of the plurality of temporal data points, the sequence table being constructed by combining segmented calibrated sequential vehicle operational feature data and calibrated sequential driving context feature data from a plurality of windows, each window corresponding to a respective one temporal sample point;
    feeding the sequence table into a deep neural network model for applying network learning to form a trained deep neural network model;
    extracting driving behavior features from the trained deep neural network model; and
    automatically determining driving behavior characteristics of the driver in the future based on the extracted driving behavior features.

2. The computer implemented method of claim 1, wherein the vehicle operational data comprises GPS vehicle location data and the sequential vehicle operational data comprises at least one member selected from the group consisting of sample points of instantaneous speed, acceleration, angular speed and a difference of each sample point from a normal instantaneous speed, acceleration, angular speed and wherein the vehicle operational data comprises OBD data obtained from the vehicle.

3. The computer implemented method of claim 1, wherein the driving context data is obtained from a plurality of IoT sensors detecting data from at least one member selected from the group consisting of weather conditions, driving route attributes and passenger information.

4. The computer implemented method of claim 1, wherein the associating step comprises applying one or more of data transformation and data interpolation.

5. The computer implemented method of claim 1, wherein the step of constructing the sequence table further comprises enframing the calibrated sequential vehicle operational feature data and calibrated sequential driving context feature data to define statistical feature data, the statistical feature data comprising at least one member selected from the group consisting of mean, standard deviation and quantiles.

6. The computer implemented method of claim 1, wherein the step of feeding the sequence table into the deep neural network model comprises applying one dimensional convolutions and poolings along a temporal axis of the plurality of windows.

7. The computer implemented method of claim 1, wherein software is provided as a service in a cloud environment.

8. A system for determining driving behavior characteristics of a driver of a vehicle, comprising:
    one or more storage devices;
    one or more hardware processors coupled to the one or more storage devices;
    one or more hardware processors operable to obtain vehicle operational data and driving context data from one or more monitoring systems over a plurality of temporal data points;
    one or more hardware processors operable to convert the obtained vehicle operational data and driving context data into sequential vehicle operational feature data and sequential driving context feature data;
    one or more hardware processors operable to associate the sequential vehicle operational feature data to the sequential driving context feature data of corresponding temporal data points of the plurality of temporal data points to form calibrated sequential vehicle operational feature data and calibrated sequential driving context feature data;
    one or more hardware processors operable to construct a sequence table of a sequence of the plurality of temporal data points based on the calibrated sequential vehicle operational feature data and the calibrated sequential driving context feature data associated with each of the plurality of temporal data points, the sequence table being constructed by combining segmented calibrated sequential vehicle operational feature data and calibrated sequential driving context feature data from a plurality of windows, each window corresponding to a respective one temporal sample point;

one or more hardware processors operable to feed the sequence table into a deep neural network model for applying network learning to form a trained deep neural network model;

one or more hardware processors operable to extract driving behavior features from the trained deep neural network model; and one or more hardware processors operable to automatically determine driving behavior characteristics of the driver in the future based on the extracted driving behavior features.

9. The system of claim 8, wherein the vehicle operational data comprises GPS vehicle location data and the sequential vehicle operational data comprises at least one member selected from the group consisting of sample points of instantaneous speed, acceleration, angular speed and a difference of each sample point from a normal instantaneous speed, acceleration, angular speed and wherein the vehicle operational data comprises OBD data obtained from the vehicle.

10. The system of claim 8, wherein the driving context data is obtained from a plurality of IoT sensors detecting data from at least one member selected from the group consisting of weather conditions, driving route attributes and passenger information.

11. The system of claim 8, wherein the one or more hardware processors operable to associate is operable to apply one or more of data transformation and data interpolation.

12. The system of claim 8, wherein the one or more hardware processors operable to construct the sequence table is further operable to enframe the calibrated sequential vehicle operational feature data and calibrated sequential driving context feature data to define statistical feature data, the statistical feature data comprising at least one member selected from the group consisting of mean, standard deviation and quantiles.

13. The system of claim 8, wherein the one or more hardware processors operable to feed the sequence table into the deep neural network model is further operable to apply one dimensional convolutions and poolings along a temporal axis of the plurality of windows.

14. A computer readable storage medium storing a program of instructions executable by a machine to perform a method of determining driving behavior characteristics of a driver of a vehicle, the method comprising:

obtaining vehicle operational data and driving context data from one or more monitoring systems over a plurality of temporal data points;

converting the obtained vehicle operational data and driving context data into sequential vehicle operational feature data and sequential driving context feature data;

associating the sequential vehicle operational feature data to the sequential driving context feature data of corresponding temporal data points of the plurality of temporal data points to form calibrated sequential vehicle operational feature data and calibrated sequential driving context feature data;

constructing a sequence table of a sequence of the plurality of temporal data points based on the calibrated sequential vehicle operational feature data and the calibrated sequential driving context feature data associated with each of the plurality of temporal data points, the sequence table being constructed by combining segmented calibrated sequential vehicle operational feature data and calibrated sequential driving context feature data from a plurality of windows, each window corresponding to a respective one temporal sample point;

feeding the sequence table into a deep neural network model for applying network learning to form a trained deep neural network model;

extracting driving behavior features from the trained deep neural network model; and automatically determining driving behavior characteristics of the driver in the future based on the extracted driving behavior features.

15. The computer readable storage medium of claim 14, wherein the associating step comprises applying one or more of data transformation and data interpolation.

16. The computer readable storage medium of claim 14, wherein the step of constructing the sequence table further comprises enframing the calibrated sequential vehicle operational feature data and calibrated sequential driving context feature data to define statistical feature data, the statistical feature data comprising at least one member selected from the group consisting of mean, standard deviation and quantiles.

17. The computer readable storage medium of claim 14, wherein the step of feeding the sequence table into the deep neural network model comprises applying one dimensional convolutions and poolings along a temporal axis of the plurality of windows.

* * * * *